(12) United States Patent
Mao et al.

(10) Patent No.: US 9,202,057 B2
(45) Date of Patent: Dec. 1, 2015

(54) SYSTEMS AND METHODS FOR IDENTIFYING PRIVATE KEYS THAT HAVE BEEN COMPROMISED

(71) Applicant: Symantec Corporation, Mountain View, CA (US)

(72) Inventors: Jun Mao, Culver City, CA (US); Matthew Yeo, San Francisco, CA (US); Abubakar Wawda, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 49 days.

(21) Appl. No.: 14/015,168

(22) Filed: Aug. 30, 2013

(65) Prior Publication Data
US 2015/0067831 A1  Mar. 5, 2015

(51) Int. Cl.
*H04L 29/06* (2006.01)
*G06F 21/57* (2013.01)
*G06F 21/56* (2013.01)

(52) U.S. Cl.
CPC .............. *G06F 21/57* (2013.01); *G06F 21/567* (2013.01); *H04L 63/126* (2013.01); *H04L 63/1441* (2013.01); *H04L 63/20* (2013.01); *G06F 2221/2115* (2013.01)

(58) Field of Classification Search
CPC ... H04L 9/3268; H04L 9/3263; H04L 9/0891; H04L 63/126; H04L 63/1441; H04L 63/20; G06F 21/57; G06F 21/567; G06F 2221/2115; G06Q 20/3829
USPC .................................................... 726/22, 25
See application file for complete search history.

(56) References Cited

U.S. PATENT DOCUMENTS

| | | | |
|---|---|---|---|
| 2003/0159090 A1* | 8/2003 | Wray et al. ...................... | 714/38 |
| 2004/0030901 A1* | 2/2004 | Wheeler et al. ................ | 713/176 |
| 2007/0086592 A1 | 4/2007 | Ellison et al. | |
| 2009/0083731 A1* | 3/2009 | Sobel ............................. | 717/177 |
| 2010/0058468 A1* | 3/2010 | Green et al. ..................... | 726/22 |
| 2012/0096516 A1 | 4/2012 | Sobel et al. | |
| 2014/0075199 A1* | 3/2014 | Hiwatari et al. ............... | 713/176 |

OTHER PUBLICATIONS

Samuel, Justin, et al. "Survivable key compromise in software update systems." Proceedings of the 17th ACM conference on Computer and communications security. ACM, 2010.*

Josang, Audun et al., "A Survey of Trust and Reputation Systems for Online Service Provision", Decision Support Systems, Elsevier Science Publishers, Amsterdam, NL, vol. 43, No. 2, (Feb. 10, 2007), 618-644.

* cited by examiner

*Primary Examiner* — Yogesh Paliwal
(74) *Attorney, Agent, or Firm* — ALG Intellectual Property, LLC

(57) ABSTRACT

A computer-implemented method for identifying private keys that have been compromised may include (1) identifying a private key that enables a signatory to digitally sign applications, (2) collecting information about the private key from at least one public source, (3) determining, based on the information collected from the public source, that the private key has been compromised and is accessible to unauthorized signatories, and (4) performing a security action in response to determining that the private key has been compromised and is accessible to the unauthorized signatories. Various other methods, systems, and computer-readable media are also disclosed.

18 Claims, 7 Drawing Sheets

SYSTEMS AND METHODS FOR IDENTIFYING PRIVATE KEYS THAT HAVE BEEN COMPROMISED

BACKGROUND

In the early days of computing, new applications were often installed via physical disks, which made it difficult for a malicious agent to impersonate a legitimate developer. Now, applications are often downloaded via the Internet from a wide variety of sources, including websites and application distribution platforms. Unfortunately, fraudulent websites and malicious developers can easily mimic legitimate developers and applications, potentially causing users to download malicious applications and posing a great risk to the security of users, systems, and enterprises.

Digital signatures are often used to ensure that applications originate from legitimate, trusted developers rather than a potentially malicious imposter. Unfortunately, the trustworthiness of a digital signature is directly proportional to the security of the private key used to create the digital signature. For example, if a private key has been compromised, then malicious agents can impersonate the key's signatory even more effectively by signing malicious applications using the compromised private key.

Traditional systems for verifying digital signatures often lack mechanisms for determining if a private key used for a digital signature has been compromised. Accordingly, the instant disclosure identifies and addresses a need for additional and improved systems and methods for identifying and protecting against private keys that have been compromised.

SUMMARY

As will be described in greater detail below, the instant disclosure generally relates to systems and methods for identifying, based on an analysis of information collected from publicly available sources, private keys that have been compromised and are accessible to agents other than their authorized signatory. In one example, a computer-implemented method for identifying private keys that have been compromised may include (1) identifying a private key that enables a signatory to digitally sign applications, (2) collecting information about the private key from at least one public source, (3) determining, based on the information collected from the public source, that the private key has been compromised and is accessible to unauthorized signatories, and (4) performing a security action in response to determining that the private key has been compromised and is accessible to unauthorized signatories.

The information about the private key may be collected in any of a variety of ways. In some embodiments, collecting the information about the private key may include collecting information about at least one application that has been digitally signed with the private key. Collecting the information about the private key may also include collecting information that indicates that the private key has been used by an unauthorized signatory to digitally sign an application.

Additionally or alternatively, collecting the information about the private key may include collecting information that indicates that the private key has been used to digitally sign both at least one trustworthy application with a high reputation score and at least one suspicious application with a low reputation score. Collecting the information about the private key may also include collecting information that indicates that the private key has been used to sign more than a predetermined number of applications.

In some examples, collecting the information about the private key may include determining that at least one instance of the private key is available for download from a publicly accessible server. In addition, the computer-implemented method may include maintaining a database that identifies publicly accessible servers that host private keys.

In some embodiments, performing the security action may include at least one of (1) warning a user that the private key has been compromised, (2) lowering a reputation score assigned to an application that has been digitally signed with the private key, (3) blocking a download of an application that has been digitally signed with the private key, and/or (4) warning the signatory that the private key has been compromised.

In some examples, determining that the private key has been compromised may include determining that a package name of at least one application digitally signed with the private key differs by more than a predetermined similarity threshold from an additional package name of at least one additional application digitally signed with the private key. In these examples, the computer-implemented method may further include determining, by analyzing the package name, that the package name has not been randomized.

In some examples, determining that the private key has been compromised may include weighting the collected information and calculating an overall trustworthiness score for the private key based on the weighted information.

In one embodiment, a system for implementing the above-described method may include (1) an identification module that identifies a private key that enables a signatory to digitally sign applications, (2) a collection module that collects information about the private key from at least one public source, (3) a determination module that determines, based on the information collected from the public source, that the private key has been compromised and is accessible to unauthorized signatories, (4) a security module that performs a security action in response to determining that the private key has been compromised and is accessible to unauthorized signatories, and (5) at least one processor configured to execute the identification module, the collection module, the determination module, and the security module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a private key that enables a signatory to digitally sign applications, (2) collect information about the private key from at least one public source, (3) determine, based on the information collected from the public source, that the private key has been compromised and is accessible to unauthorized signatories, and (4) perform a security action in response to determining that the private key has been compromised and is accessible to unauthorized signatories.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
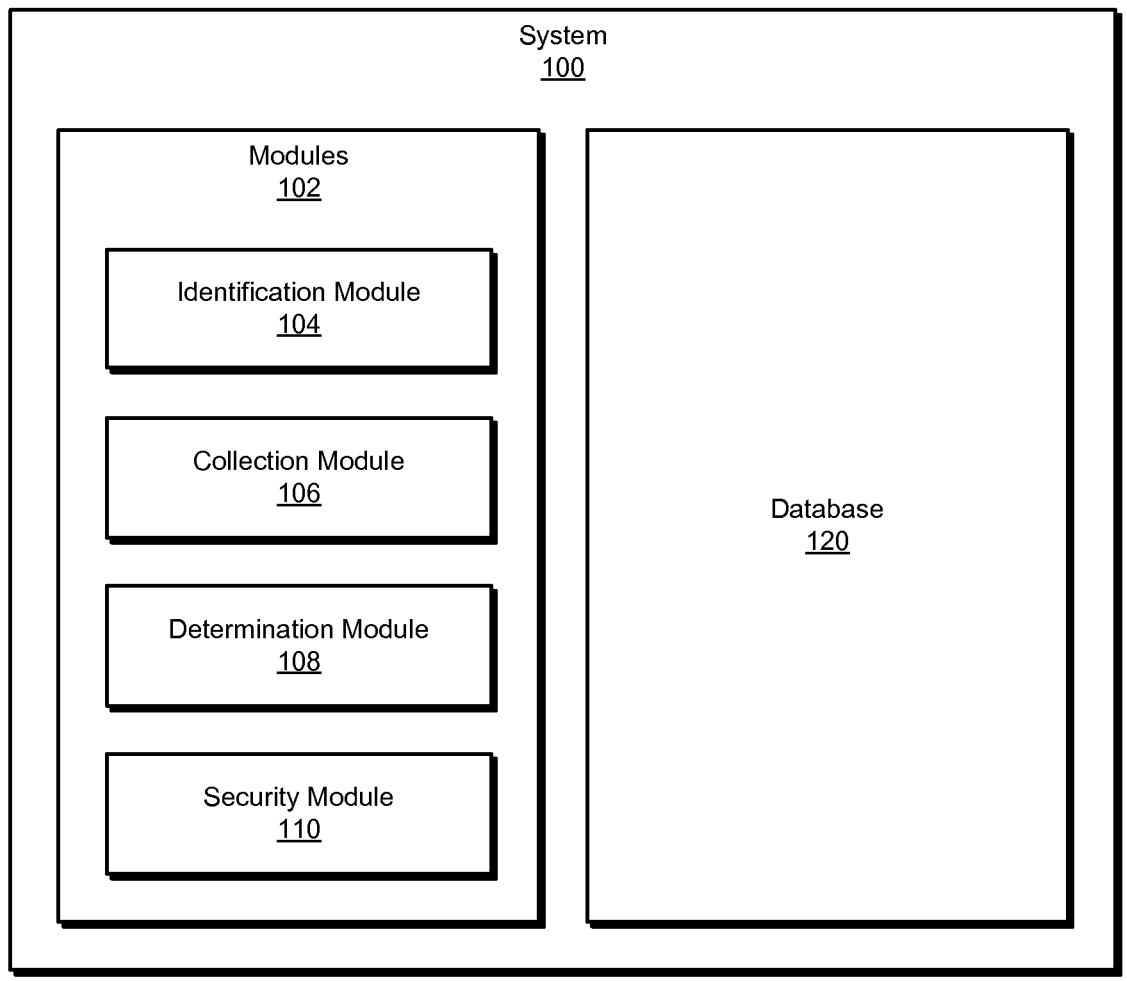
FIG. 1 is a block diagram of an exemplary system for identifying private keys that have been compromised.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for identifying private keys that have been compromised. As will be explained in greater detail below, by determining that private keys have been compromised based on an analysis of information collected from publicly available sources, the systems described herein may (1) improve the security of users by warning them that an application has been signed by a compromised private key, (2) improve the security of signatories by warning them that their private key has been compromised, and/or (3) improve the security of application distribution platforms by lowering reputation scores for and/or blocking applications that have been signed with compromised private keys.

The following will provide, with reference to FIGS. 1-2, 4 and 5, detailed descriptions of exemplary systems for identifying private keys that have been compromised. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for identifying private keys that have been compromised. As illustrated in this figure, exemplary system 100 may include one or more modules 102 for performing one or more tasks. For example, and as will be explained in greater detail below, exemplary system 100 may include an identification module 104 that may identify a private key that enables a signatory to digitally sign applications. Exemplary system 100 may additionally include a collection module 106 that may collect information about the private key from at least one public source.

Exemplary system 100 may also include a determination module 108 that may determine, based on the information collected from the public source, that the private key has been compromised and is accessible to unauthorized signatories. Exemplary system 100 may additionally include a security module 110 that may perform a security action in response to determining that the private key has been compromised and is accessible to unauthorized signatories. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store records of known key-distribution websites.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
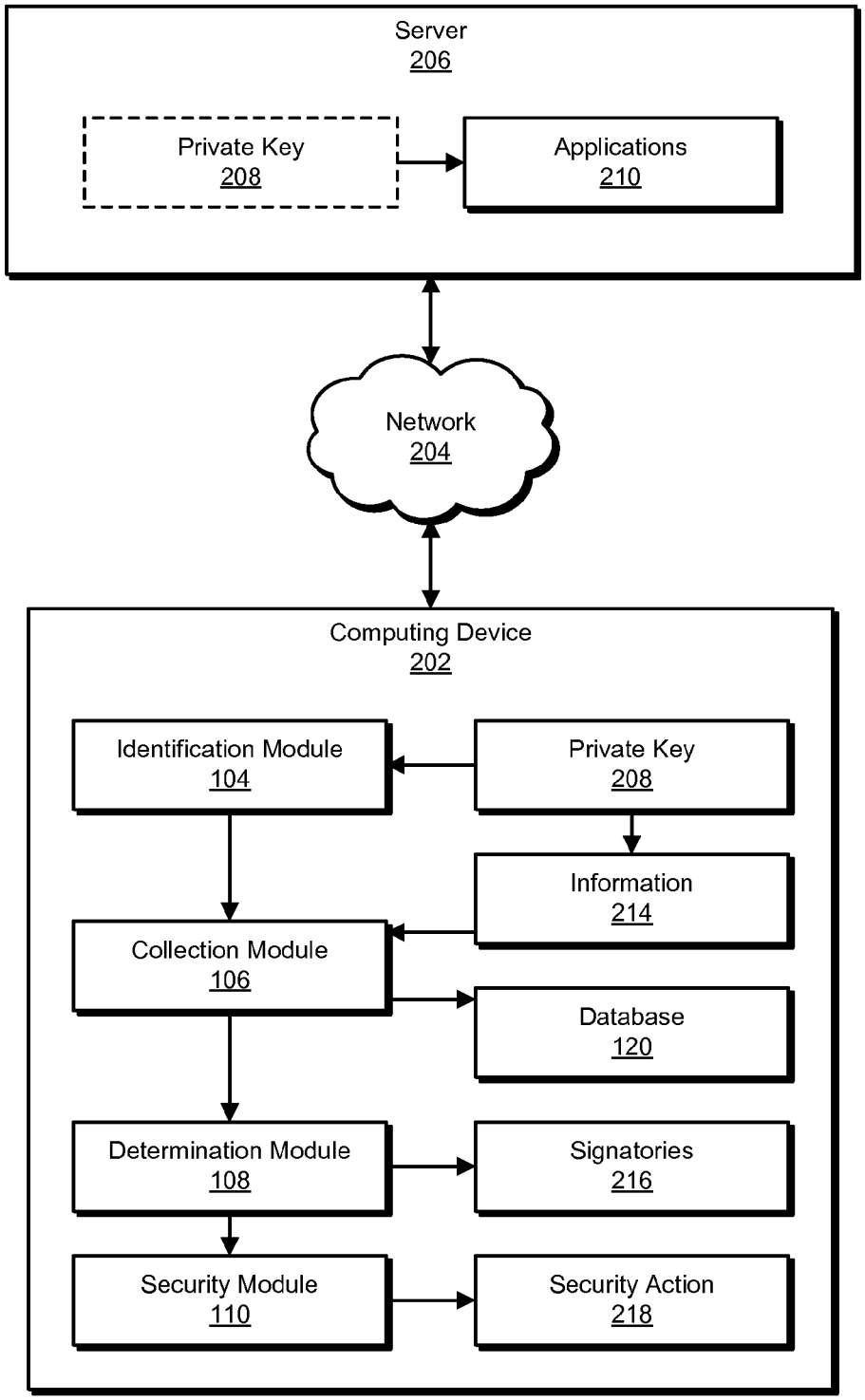
FIG. 2 is a block diagram of an exemplary system for identifying private keys that have been compromised.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in identifying private keys that have been compromised. For example, and as will be described in greater detail below, identification module 104 may be programmed to identify a private key 208 that enables a signatory to digitally sign applications 210. In addition, collection module 106 may be programmed to collect information 214 about private key 208 from at least one public source. Determination module 108 may be programmed to determine, based on information 214 collected from the public source, that private key 208 has been compromised and is accessible to signatories 216. In addition, security module 110 may be programmed to perform a security action 218 in response to determining that private key 208 has been compromised and is accessible to signatories 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device. In some examples, computing device 202 may represent an endpoint device, such as a client device. In other examples, however, computing device 202 may represent a server or other form of back-end device, such as a computing device that provides (either alone or in combination with other computing device) an application distribution platform.

Server 206 generally represents any type or form of computing device (or group of computing devices) that is capable of hosting applications. Examples of server 206 include, without limitation, application distribution platforms used to digitally distribute computer software.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
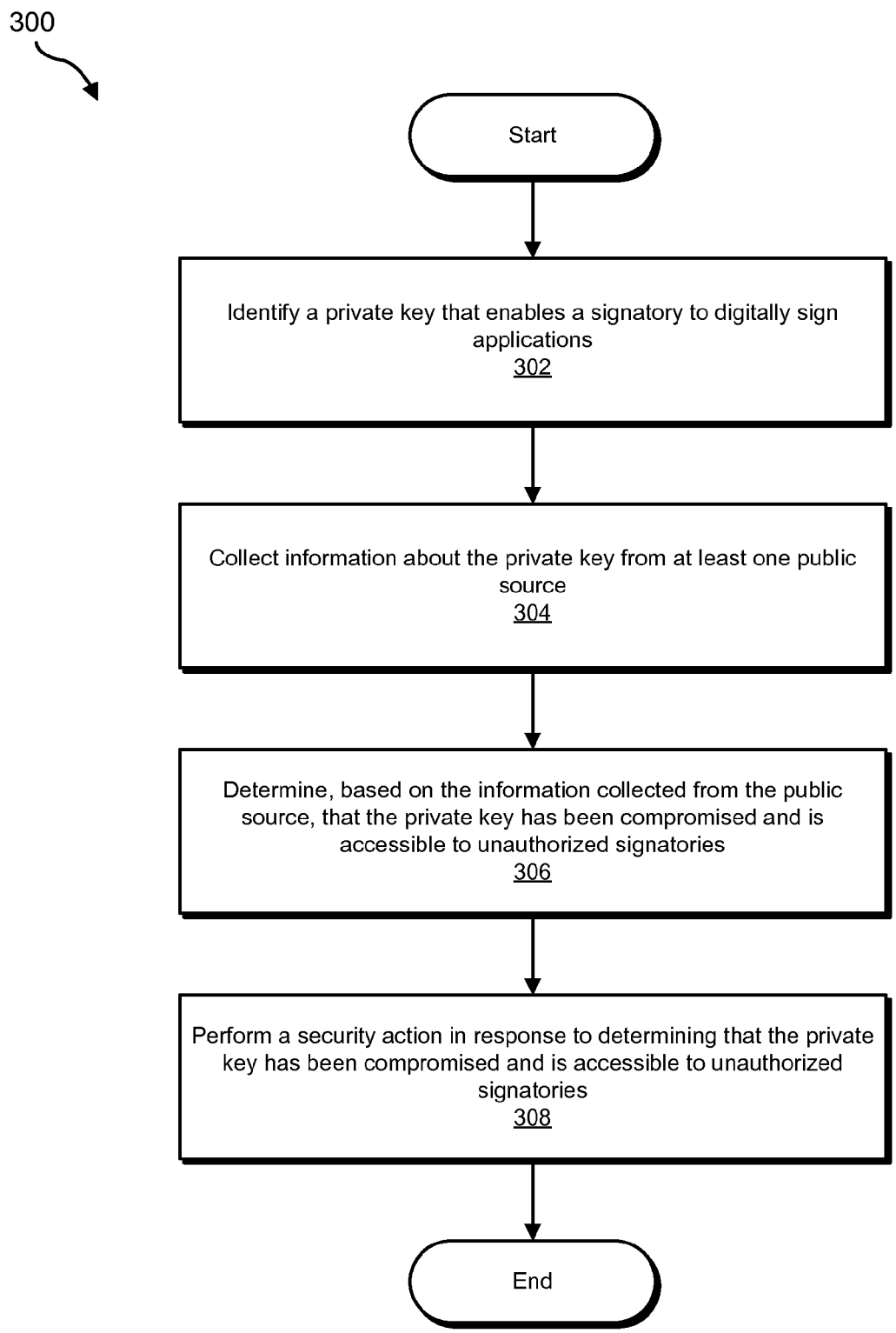
FIG. 3 is a flow diagram of an exemplary method for identifying private keys that have been compromised.
Figure 4:
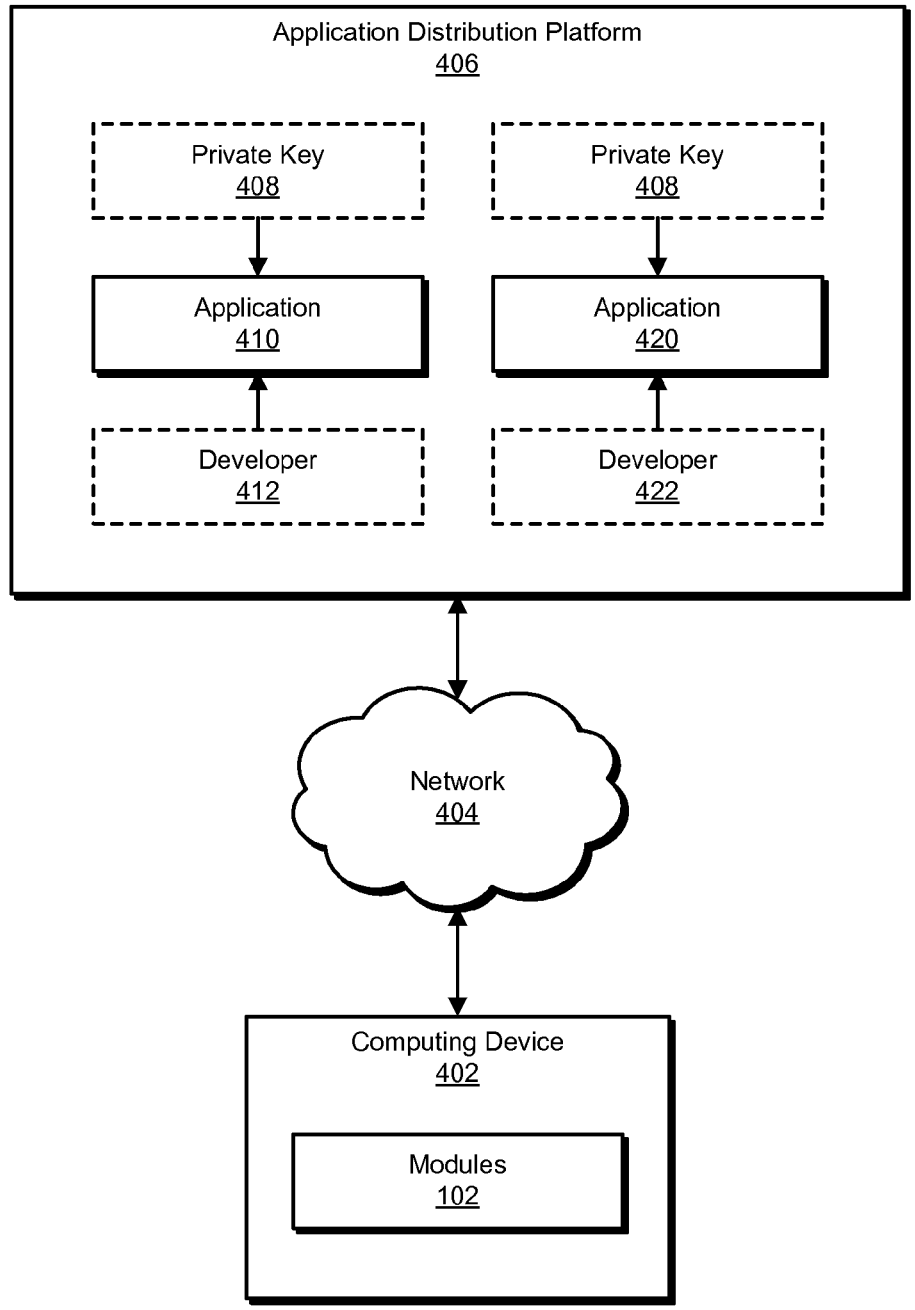
FIG. 4 is a block diagram of an exemplary system for identifying private keys that have been compromised.

FIG. 3 is a flow diagram of an exemplary computer-implemented method 300 for identifying private keys that have been compromised. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a private key that enables a signatory to digitally sign applications. For example, at step 302 identification module 104 may, as part of computing device 202 in FIG. 2, identify a private key 208 that enables a signatory to digitally sign applications 210.

The term "private key," as used herein, generally refers to the non-public half of an asymmetric key pair that may be used to digitally sign files and/or applications. In some examples, a private key may be used to digitally sign a file, and the digital signature may later be authenticated using a public key that corresponds to the private key. In these examples, authentication of the digital signature may verify both that the file was signed by the private key and that the file has not been tampered with. For example, a developer may sign an application with a private key, and a user may authenticate the digital signature of the application in order to verify both that the application was signed by the developer (as opposed to an imposter) and has not been tampered with. As will described in greater detail below, if a malicious actor gains access to a private key used by a legitimate developer, the malicious actor may use the private key to digitally sign harmful applications that may appear to users to originate from the legitimate developer.

The systems described herein may identify the private key in a variety of ways. For example, identification module 104 may identify private key 208 upon downloading (from, e.g., an application distribution platform or website) or otherwise encountering an application that has been signed by private key 208.

At step 304, one or more of the systems described herein may collect information about the private key from at least one public source. For example, at step 304 collection module 106 may, as part of computing device 202 in FIG. 2, collect information 214 about private key 208 from at least one public source.

The systems described herein may collect information about the public key in any or all of a variety of ways and/or contexts. In one example, collection module 106 may collect information about private key 208 from public sources, such as websites, web searching services, application distribution platforms, servers, and/or databases. For example, collection module 106 may collect information about private key 208 from an application distribution platform (such as server 206) that provides access to at least one mobile application signed with the private key. Examples of such application distribution platforms include, for example, mobile application stores (such as GOOGLE PLAY, the APPLE APP STORE, the WINDOWS PHONE STORE, and/or the AMAZON APPSTORE), non-mobile application stores (such as the WINDOWS STORE), and any other service or platform capable of digitally distributing computer software.

The systems described herein may collect a variety of information from these public sources. For example, collection module 106 may collect information about at least one application that has been digitally signed with private key 208. Examples of the types of information that collection module 106 may collect include, without limitation, the name of the application signed by the private key, the name, location, and/or website of the developer that signed and/or published the application, the source of origin of the application, reputation data for the application, user ratings for the application, the publication date of the application, prevalence information for the application (e.g., the number of times the application has been downloaded, globally and/or with respect to a specific application distribution platform), and/or any other information that may be relevant to the application and/or the private key used to sign the application.

In some embodiments, the systems described herein may collect information about multiple applications that have been digitally signed with the private key. For example, collection module 106 may collect information about an application 410 and an application 420 in FIG. 4, which may represent mobile applications available for download via an application distribution platform 406. In this example, collection module 106 may collect information (from, e.g., application distribution platform 406 and/or an external source) that indicates that both application 410 and application 420 were signed by the same private key (i.e., private key 408), but published by different developers (i.e., developer 412 and developer 422). As will be explained in greater detail below, this information may indicate that private key 408 has been compromised since multiple signatories have access to private key 408.

In some examples, the systems described herein may also collect information that indicates that the private key has been used by an unauthorized signatory (e.g., a developer other than the signatory that owns the private key) to digitally sign an application. For example, collection module 106 may collect information from application distribution platform 406 in FIG. 4 that indicates that private key 408 has been used to sign an application (e.g., application 420) published by an account that is not connected to the signatory that owns private key 408. As will be explained in greater detail below, this information may indicate that private key 408 has been compromised since multiple signatories have access to private key 408.

In some embodiments, the systems described herein may also collect information that indicates that the private key has been used to digitally sign both at least one trustworthy application with a high reputation score and at least one suspicious application with a low reputation score. For example, collection module 106 may collect information that indicates that private key 408 was used to digitally sign both a trustworthy application with a high reputation score (e.g., application 410) and a suspicious application with a low reputation score (e.g., application 420), which may indicate that private key 408 has been compromised.

Reputation scores may be based on a number of factors, including, but not limited to, user ratings, download counts, anti-virus signatures, static analysis of application code, and/or dynamic analysis of application processes. For example, a trustworthy mobile application named "Enraged Avians" may have a download count numbering in the millions with very high user ratings, and may have been certified as non-malicious by several pieces of anti-virus software. Another mobile application, "Incensed Avians," may have been signed by the same private key as "Enraged Avians," but may have been published by a different developer, and may have a low reputation score due to a low download count and the presence of malware within the application. In this example, this may indicate that the application "Incensed Avians" represents an imposter application, which may indicate that the private key used to sign this imposter application has been compromised.

In some examples, the systems described herein may also collect information that indicates that the private key has been used to sign more than a predetermined number of applications. For example, collection module 106 may collect information that indicates that private key 208 in FIG. 2 has been used to sign more than 1,000 applications, which may (in some examples) indicate that private key 208 has been compromised. In some embodiments, this predetermined number may be based on the expected usage of the key. For example, if the signatory only intends to sign one application with the private key, then the predetermined number may be two. However, if the signatory expects to sign several hundred applications with the private key, then the predetermined number may be six hundred. In some examples, collection module 106 may collect information about applications that have been signed with the private key from multiple different application distribution platforms.

In some embodiments, the systems described herein may also collect information that indicates that at least one instance of the private key is available for download from a publicly accessible server. For example, collection module 106 may determine (by, e.g., crawling the Internet and/or checking against a database of known servers) that private key 208 in FIG. 2 is available for download from a publicly accessible server that provides access to private keys that have been compromised. Examples of such publicly accessible servers include, without limitation, key-distribution websites, modified ROM publishing websites, and any other source capable of providing access to compromised keys. Private keys may be available for download from publicly accessible servers due, for example, to having been leaked, stolen, and/or used to sign open-source software. As detailed below, the fact that a private key is available for download from a publically accessible server may indicate that the private key has been compromised.

In some embodiments, the systems described herein may maintain a database that identifies publicly accessible servers that host private keys. For example, collection module 106 may maintain database 120, which may contain a record of each known publicly accessible server that hosts private keys for download. Collection module 106 may maintain database 120 in a variety of ways, including, for example, by creating the same via manual input and/or by automatically populating the same using information crawled from the Internet. In some examples, collection module 106 may also update database 120 when collecting information about private key 208.

Returning to FIG. 3, at step 306 one or more of the systems described herein may determine, based on the information collected from the public source, that the private key has been compromised and is accessible to unauthorized signatories. For example, at step 306 determination module 108 may, as part of computing device 202 in FIG. 2, determine, based on information 214 collected from various public sources, that private key 208 has been compromised and is accessible to multiple signatories 216.

The systems described herein may determine that the private key has been compromised in a variety of ways. For example, determination module 108 may determine, based on the information collected in step 306, that private key 208 has been used by and/or is accessible to at least one developer other than the signatory that owns private key 208. Specifically, determination module 108 may determine that (1) private key 208 has been used by an unauthorized signatory (e.g., a developer other than the signatory that owns private key 208) to digitally sign an application, (2) private key 208 has been used to digitally sign both at least one trustworthy application with a high reputation score and at least one suspicious application with a low reputation score, (3) private key 208 has been used to digitally sign more than a predetermined number of applications, and/or (4) at least one instance of private key 208 is available for download from a publicly accessible server.

Additionally or alternatively, the systems described herein may determine that the private key has been compromised by determining that a package name of at least one application digitally signed with the private key differs by more than a predetermined similarity threshold from an additional package name of at least one additional application digitally signed with the private key. In some examples, this predetermined similarity threshold may be calculated to include similar names and incorrect spellings of names but exclude entirely different names. Examples of this predetermined similarity threshold include, without limitation, "a difference of three characters or fewer" or "a difference of 15% of the total characters or fewer." For example, the package name of "com.symantec.abc" may fall within a predetermined similarity threshold for "com.symantec.xyz" that requires "a difference of three characters or fewer" since this package name differs by less than three characters. In contrast, the package name of "foo.xymatekk.abc" may not fall within this predetermined similarity threshold since this package name differs by more than three characters. Determination module 108 may also calculate the predetermined similarity threshold by using a database of organization and package names. For example, determination module 108 may determine that the package name "com.symsecurity.xyz" falls within a predetermined similarity threshold for "com.symantec.xyz" because "com.symsecurity.xyz" is listed in a database as belonging to the same organization as "com.symatec.xyz."

In some programming languages, it may be a convention for package names to include the name of the organization responsible for the package. As such, if determination module 108 determines that an application that has been signed with a private key includes a package named with a different organization than the organization that is the signatory for the private key, then determination module 108 may determine that this private key has been compromised.

In some embodiments, the systems described herein may attempt to avoid false positives by determining, by analyzing the package name of an application, that the package name has not been randomized. Because legitimate organizations often randomize the name of their application packages, an application's package name that fails to fall within a predetermined similarity threshold due to being randomized may not be an indication of a compromised private key. For example, even if the package name "com.zxcezfzdwed.fsi" fails to satisfy a predetermined similarity threshold for "com.symantec.xyz," this package may still have been created by the same developer since the package name has been randomized and does not represent an attempt to spoof the developer's name.

Figure 5:
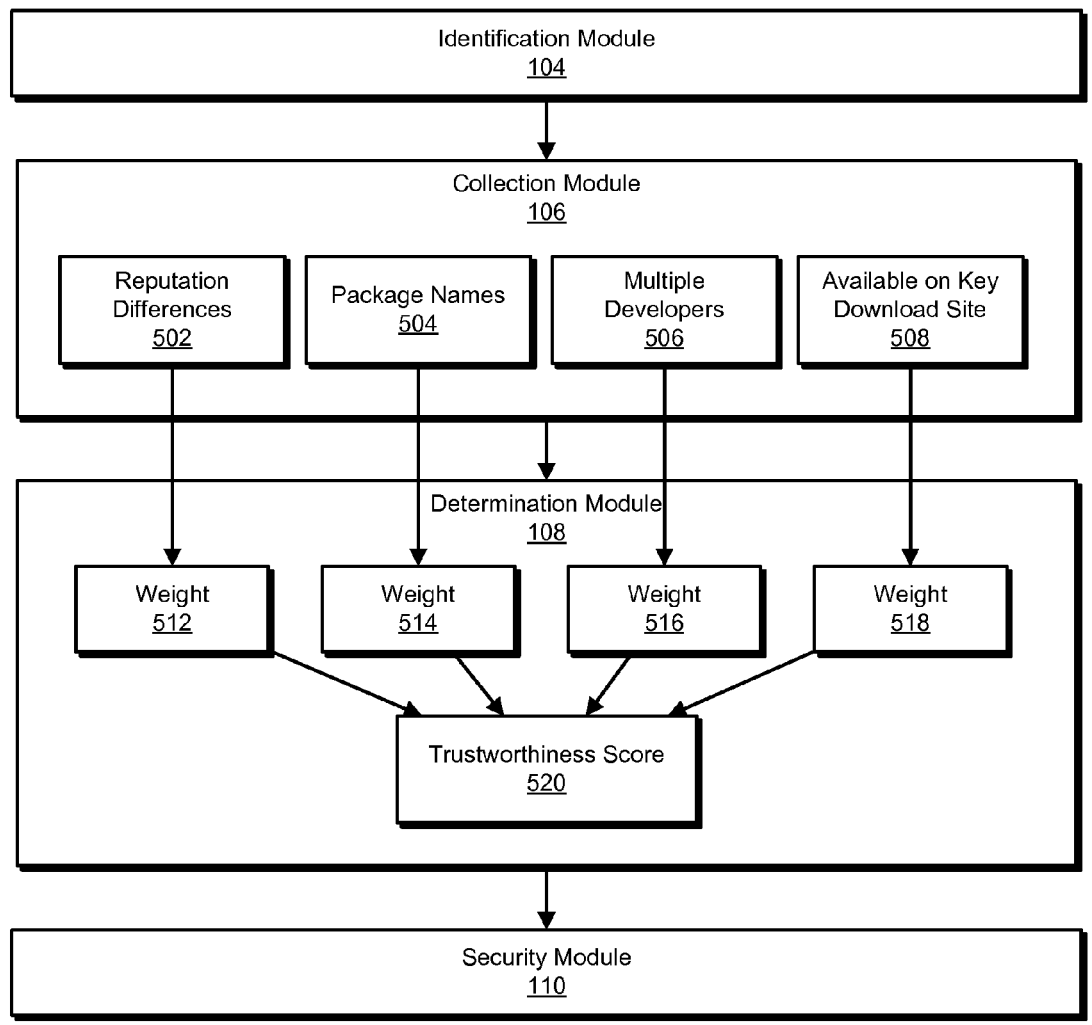
FIG. 5 is a block diagram of an exemplary system for identifying private keys that have been compromised.

In some examples, the systems described herein may determine that the private key has been compromised by weighting the information collected in step 304 and calculating an overall trustworthiness score for the private key based on this weighted information. FIG. 5 is a block diagram of an exemplary computing system 500 for identifying private keys that have been compromised by weighting and combining information about these private keys. As illustrated in FIG. 5, identification module 104 may identify a private key and/or at least one application signed with the private key. Collection module 106 may then collect a variety of information about the private key and/or applications signed with the private key, including, without limitation, the reputations of applications signed by the private key (e.g., reputation differences 502), the names of packages signed by the private key (e.g., package names 504), whether multiple developers have used the private key to sign applications (e.g., multiple developers 506), and/or whether the private key is available for download from a publicly accessible server (e.g., available on key download site 508). A more detailed understanding of what these pieces of information might signify is provided in connection with steps 304 and 306 above.

Once collection module 106 collects this information, determination module 108 may weight reputation differences 502, package names 504, multiple developers 506, and/or available on key download site 508 with weights 512, 514, 516 and/or 518, respectively, and may combine the weighted information to arrive at trustworthiness score 520. Determination module 108 may then use trustworthiness score 520 to determine whether the private key has been compromised.

For example, collection module 106 may collect information that indicates that a private key (1) has been used to sign both an application with a very high reputation as well as an application with a very low reputation, (2) has not been used to sign any applications with differing package names, (3) has been used to sign applications published by three different developers, and (4) is available on at least one key download site. In this example, determination module 108 may weight these reputation differences as a 5, differing package names as a 2, each additional developer beyond the first as a 7, and/or availability on a key download site as a 10. Determination module 108 may then multiply each of the pieces of information with an initial value of 1, 0, 2, and 1, respectively, by the weights of 5, 2, 7 and 10, respectively, and add the weighted numbers to arrive at a trustworthiness score of 29. In this example, determination module may then calculate that the trustworthiness score for the private key exceeds a predetermined threshold of 10 and therefore the private key may have been compromised.

Returning to FIG. 3, at step 308 one or more of the systems described herein may perform a security action in response to determining that the private key has been compromised and is accessible to unauthorized signatories. For example, at step 308 security module 110 may, as part of computing device 202 in FIG. 2, perform a security action 218 in response to determining that private key 208 has been compromised and is accessible to signatories 216.

The systems described herein may perform any of a variety of security actions, either alone or in combination. For example, in response to determining that the private key has been compromised, security module 110 may perform a security action that applies to the private key, an application signed by the private key, the signatory of the private key, and/or users of an application signed by the private key.

For example, security module 110 may perform a server-side security action by (1) warning a user that the private key has been compromised (by, e.g., placing a warning within an application distribution platform on the download page of an application signed by the compromised key), (2) lowering a reputation score assigned to an application that has been digitally signed with the private key (by, e.g., lowering the reputation score displayed by an application distribution platform for an application signed with the compromised private key), (3) blocking the download of an application that has been digitally signed with the private key (by, e.g., removing the application from an application distribution platform), and/or (4) warning the signatory that the private key has been compromised (by, e.g., sending a message to the signatory's developer account in the application distribution platform).

Additionally or alternatively, security module 110 may perform a client-side security action by (1) warning a user that the private key has been compromised (by, e.g., alerting a user of a mobile device that they are attempting to download a mobile application that has been signed by a compromised private key), (2) lowering a reputation score assigned to an application that has been digitally signed with the private key (by, e.g., calculating a reputation score on a mobile device for a mobile application signed by the compromised key and displaying the reputation score to a user of the mobile device), and/or (3) blocking the download of an application that has been digitally signed with the private key (by, e.g., preventing a user from downloading the application to their mobile device).

In summary, and as explained above in connection with method 300 in FIG. 3, the systems described herein may identify a private key that may be used by a signatory, often an application developer, to digitally sign applications. In some examples, these applications may be mobile applications that are available from an application distribution platform, such as a mobile application store. The systems described herein may then collect information about the private key, often by collecting information about applications that have been signed with the private key.

Information of various types may be collected. For example, the systems described herein may collect information that indicates that the private key has been used by multiple developers to sign applications, that applications signed by the private key have a suspicious variance in reputation scores, that applications signed by the private key include differently named packages, and/or that the private key is available for download from a publicly accessible key download website. The systems described herein may then weight any or all of this information and combine the weighted information to produce an overall trustworthiness rating.

Based on this trustworthiness rating, the systems described herein may then determine that the private key is available to developers other than the signatory and thus has been compromised. The systems described herein may then take any of a number of security actions, including warning the developer that their key has been leaked, warning users that an application they may be attempting to download has been signed by a compromised key and thus may represent an imposter or otherwise malicious application, and/or removing potentially malicious applications signed by the compromised key from application distribution platforms.

As explained above, by determining that private keys have been compromised based on an analysis of information collected from publicly available sources, the systems described herein may (1) improve the security of users by warning them that an application has been signed by a compromised private key, (2) improve the security of signatories by warning them that their private key has been compromised, and/or (3) improve the security of application distribution platforms by lowering reputation scores for and/or blocking applications that have been signed with compromised private keys.

Figure 6:
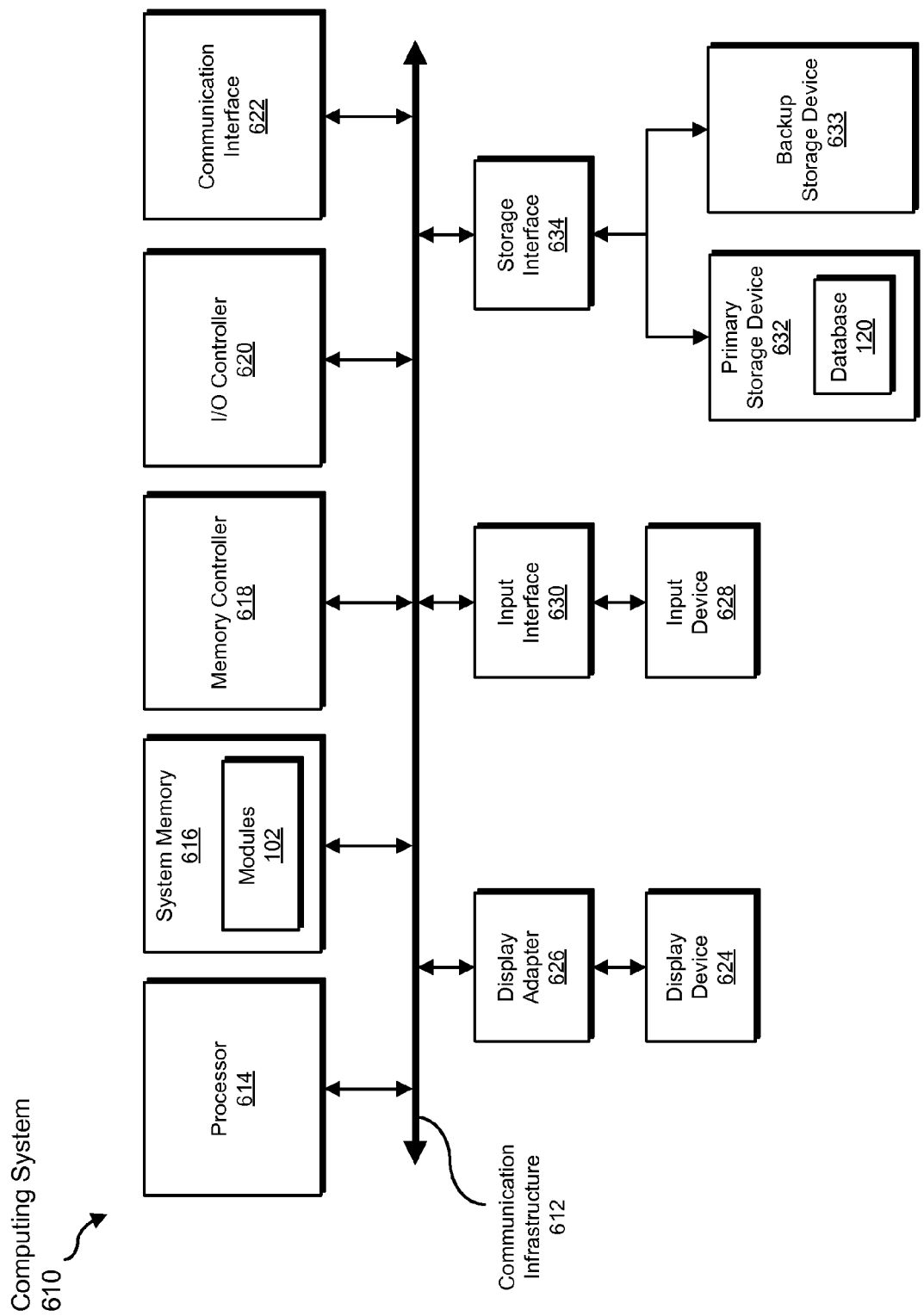
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems. In one example, database 120 from FIG. 1 may be stored in primary storage device 632.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
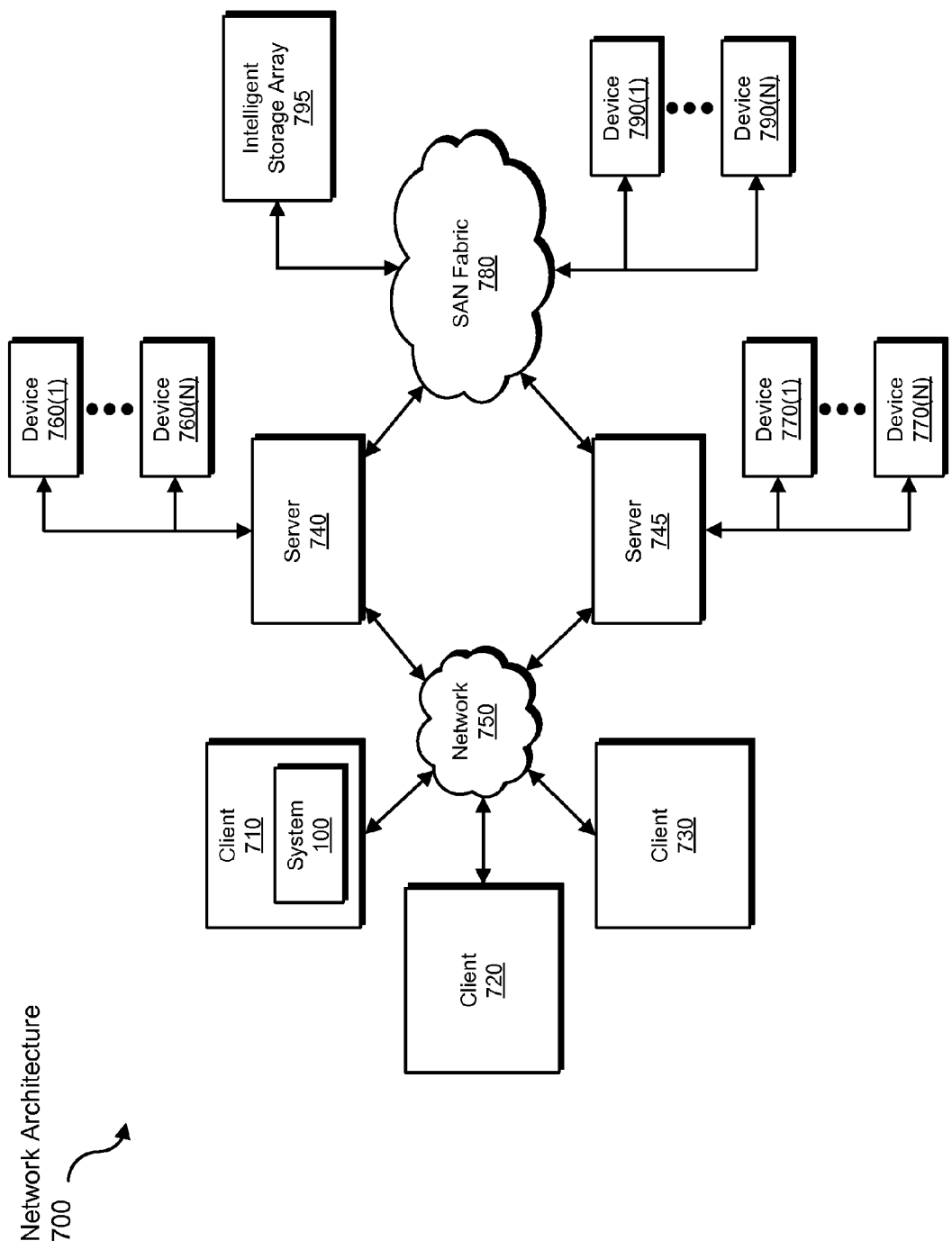
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for identifying private keys that have been compromised.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information to be transformed, transform the information, output a result of the transformation to a determination module, use the result of the transformation to determine that a private key may have been compromised, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying private keys that have been compromised, at least a portion of the method being performed by a computing device comprising at least one processor, the method comprising:
    identifying, by the computing device, a private key that enables a signatory to digitally sign applications;
    collecting, by the computing device, information about the private key from at least one public source, the information identifying a package name of an application digitally signed with the private key;
    determining, by the computing device and based on the information collected from the public source, that the private key has been compromised and is accessible to unauthorized signatories, wherein determining that the private key has been compromised comprises determining that the package name of the application digitally signed with the private key differs by more than a predetermined similarity threshold from an additional package name of at least one additional application digitally signed with the private key;
    performing a security action in response to determining that the private key has been compromised and is accessible to the unauthorized signatories.

2. The computer-implemented method of claim 1, wherein collecting the information about the private key comprises collecting information about at least one application that has been digitally signed with the private key.

3. The computer-implemented method of claim 1, wherein collecting the information about the private key comprises collecting information that indicates that the private key has been used by an unauthorized signatory to digitally sign an application.

4. The computer-implemented method of claim 1, wherein collecting the information about the private key comprises collecting information that indicates that the private key has been used to digitally sign both at least one trustworthy application with a high reputation score and at least one suspicious application with a low reputation score.

5. The computer-implemented method of claim 1, wherein collecting the information about the private key comprises collecting information that indicates that the private key has been used to sign more than a predetermined number of applications.

6. The computer-implemented method of claim 1, wherein collecting the information about the private key comprises determining that at least one instance of the private key is available for download from a publicly accessible server.

7. The computer-implemented method of claim 1, further comprising determining, by analyzing the package name, that the package name has not been randomized.

8. The computer-implemented method of claim 1, wherein determining that the private key has been compromised comprises:
    weighting the information;
    calculating an overall trustworthiness score for the private key based on the weighted information.

9. The computer-implemented method of claim 1, wherein performing the security action comprises at least one of:
    warning a user that the private key has been compromised;
    lowering a reputation score assigned to an application that has been digitally signed with the private key;
    blocking a download of an application that has been digitally signed with the private key;
    warning the signatory that the private key has been compromised.

10. The computer-implemented method of claim 1, further comprising maintaining a database that identifies publicly accessible servers that host private keys.

11. A system for identifying private keys that have been compromised, the system comprising:
- an identification module, stored in memory, that identifies a private key that enables a signatory to digitally sign applications;
- a collection module, stored in memory, that collects information about the private key from at least one public source, the information identifying a package name of an application digitally signed with the private key;
- a determination module, stored in memory, that determines, based on the information collected from the public source, that the private key has been compromised and is accessible to unauthorized signatories, wherein determining that the private key has been compromised comprises determining that the package name of the application digitally signed with the private key differs by more than a predetermined similarity threshold from an additional package name of at least one additional application digitally signed with the private key;
- a security module, stored in memory, that performs a security action in response to determining that the private key has been compromised and is accessible to the unauthorized signatories;
- at least one physical processor configured to execute the identification module, the collection module, the determination module, and the security module.

12. The system of claim 11, wherein the collection module collects the information about the private key by collecting information about at least one application that has been digitally signed with the private key.

13. The system of claim 11, wherein the collection module collects the information about the private key by collecting information that indicates that the private key has been used by an unauthorized signatory to digitally sign an application.

14. The system of claim 11, wherein the collection module collects the information about the private key by collecting information that indicates that the private key has been used to digitally sign both at least one trustworthy application with a high reputation score and at least one suspicious application with a low reputation score.

15. The system of claim 11, wherein the collection module collects the information about the private key by collecting information that indicates that the private key has been used to sign more than a predetermined number of applications.

16. The system of claim 11, wherein the determination module determines, by analyzing the package name, that the package name has not been randomized.

17. The system of claim 11, wherein the security module performs the security action by at least one of:
- warning a user that the private key has been compromised;
- lowering a reputation score assigned to an application that has been digitally signed with the private key;
- blocking a download of an application that has been digitally signed with the private key;
- warning the signatory that the private key has been compromised.

18. A non-transitory computer-readable-storage medium comprising one or more computer-readable instructions that, when executed by at least one processor of a computing device, cause the computing device to:
- identify, by the computing device, a private key that enables a signatory to digitally sign applications;
- collect, by the computing device, information about the private key from at least one public source, the information identifying a package name of an application digitally signed with the private key;
- determine, by the computing device and based on the information collected from the public source, that the private key has been compromised and is accessible to unauthorized signatories, wherein determining that the private key has been compromised comprises determining that the package name of the application digitally signed with the private key differs by more than a predetermined similarity threshold from an additional package name of at least one additional application digitally signed with the private key;
- perform a security action in response to determining that the private key has been compromised and is accessible to the unauthorized signatories.

* * * * *